Patented Jan. 2, 1951

2,536,498

UNITED STATES PATENT OFFICE 2,536,498

VINYL CHLORIDE RESINS PLASTICIZED WITH ALKYL ESTERS OF SULFONYL DIPROPIONIC ACID

George L. Fraser, Springfield, Mass., assignor to Monsanto Chemical Company, St. Louis, Mo., a corporation of Delaware No Drawing. Application September 25, 1948, Serial No. 51,320

12 Claims. (Cl. 260—30.8)

This invention relates to a new class of compounds of wide utility for use as plasticizers and softeners in plastic compositions.

In particular, this invention relates to esters of dipropion sulfone and their use as plasticizers and softeners.

It is an object of this invention to provide a new class of plasticizing and softening agents. A further object of the invention is to provide plasticized compositions having as a base plasticizable high molecular weight materials. A particular object of the invention is to provide plasticized vinyl chloride polymer compositions.

These and other objects are accomplished according to this invention by providing as plasticizing and softening agents for high molecular weight materials, alkyl esters of sulfonyl dipropionic acid in which the alkyl groups contain 6–12 carbon atoms. These esters may be represented by the following general formula:

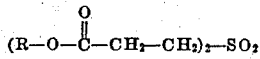

wherein R is an alkyl group having 6–12 carbon atoms. It is found that plasticized compositions containing the above esters are characterized by unusual flexibility, coupled with high plasticizer rententivity, both at ordinary temperatures and at elevated temperatures.

The following examples are illustrative of the present invention, but are not to be construed as limitative thereof. Where parts are mentioned, they are parts by weight.

Example I 100 parts of polyvinyl chloride are mixed with 50 parts of 2-ethyl hexyl sulfonyl dipropionate on milling rolls maintained at a temperature of 300° F., to form a homogeneous composition. From this composition there are pressed sheets 0.020 inch in thickness. These sheets are found to be clear and substantially colorless. They are characterized by a high degree of flexibility over a wide range of temperatures and are found to suffer relatively low weight loss on long standing and at elevated temperatures.

Furthermore, these sheets are found to have a tensile strength of 2680 pounds per square inch, an ultimate elongation of 340% and a modulus at 100% elongation of 1610 pounds per square inch.

Example II

Example I is repeated except that 100 parts of the ester are used. The product has generally the same properties as the product of Example I, but is somewhat more flexible.

Example III 100 parts of cellulose acetate (55% acetyl groups) and 50 parts of 2-ethyl hexyl sulfonyl dipropionate are dissolved in 1000 parts of acetone. The resulting solution is flowed onto a glass plate and the acetone allowed to evaporate therefrom. The resulting films are clear and colorless. In addition, they are found to be flexible and somewhat elastic.

Example IV 100 parts of polystyrene and 50 parts of the 2-ethyl hexyl sulfonyl dipropionate are dissolved in 1000 parts of toluene. Films prepared from the resulting solution after evaporation of the solvent are found to be clear and colorless and to possess a considerable degree of flexibility.

Example V 100 parts of polyvinyl butyral acetal resin and 50 parts of 2-ethyl hexyl sulfonyl dipropionate are dissolved in 1000 parts of ethanol. Films are prepared from the resulting solution and the ethanol allowed to evaporate therefrom. The dried films are clear and colorless and unusually flexible and elastic.

The ester plasticizers of the invention may be prepared by oxidizing the corresponding esters of β-thiodipropionic acid. The following is an example of the preparation of 2-ethyl hexyl dipropion sulfone.

Example A 100 parts of 2-ethyl hexyl β-thiodipropionate is mixed with 100 parts of glacial acetic acid and 100 parts of an aqueous solution of hydrogen peroxide (30% H₂O₂). The mixture is heated at 20–80° C. for 16–20 hours. The resulting water-insoluble material was purified by washing with water, drying and distilling under vacuum. The purified product is a colorless liquid having a boiling point of 280–285° C. at an absolute pressure of 4 millimeters of mercury. This ester which is new in the art has the following formula:

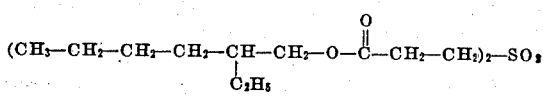

In place of the 2-ethyl hexyl ester of sulfonyl dipropionic acid, other esters in which the alkyl groups have 6–12 carbon atoms may be used in plasticizing high molecular weight materials. Thus, the hexyl, heptyl, nonyl, decyl, undecyl and dodecyl dipropion sulfones may be prepared by the method of Example A by substituting the corresponding esters for 2-ethyl hexyl β-thiodipropionate and may be used in providing plasticized compositions having unique characteristics. The alkyl groups in these esters may have straight or branched chains.

In preparing the esters of the invention considerable latitude in reaction conditions is permissible. Thus, substantially varying reaction temperatures may be used, e. g., from 20° to 150° C. However, in order to avoid an unduly lengthy reaction, temperatures of 50–80° C. or higher are usually preferred.

The new ester plasticizers of the invention are useful as plasticizers and softeners for high molecular weight materials generally. Examples of such materials include cellulose esters, e. g., cellulose acetate, cellulose propionate, cellulose nitrate; cellulose ethers, e. g., ethyl cellulose, methyl cellulose, chlorinated rubber; synthetic resins such as polymerized vinyl aromatic materials, e. g., polystyrene; polyvinyl esters, e. g., polyvinyl chloride, polyvinyl acetate, polyvinylidene chloride, as well as copolymers of these and other polymerizable materials; polyvinyl acetal resins, e. g., polyvinyl formal, polyvinyl acetaldehyde acetal, polyvinyl butyral, etc.

The amount of plasticizer or softener which is incorporated in the plasticizable material depends upon the particular characteristics which it is desired to impart to the plasticizable material, as well as on the compatibility of the plasticizer in the composition. In the case of the plasticizers of the invention, it is usually desirable to incorporate at least 5 parts in every 100 parts of plasticizable material and generally, from 25–75 parts yield the most advantageous properties. However, the amount used should not exceed its compatibility in the composition. Mixtures of the esters of the invention with other plasticizers may be desirable in certain instances. Typical of well known plasticizers which may be used in conjunction with the esters of the invention are dioctyl phthalate, tricresyl phosphate, dibutyl phthalate, etc.

In particular, it is found that the esters of the invention are especially valuable in admixture with vinyl chloride-containing polymers. Thus, in place of polyvinyl chloride, the esters of the invention may be used in conjunction with various copolymers of vinyl chloride and other unsaturated materials copolymerizable therewith. Examples of such copolymers include copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate and the corresponding esters of methacrylic acid; vinyl aromatic compounds, for example, styrene, ortho-chloro-styrene, para-chloro-styrene, 2,5-dichloro-styrene, 2,4-dichloro-styrene, para-ethyl styrene, vinyl naphthalene, alpha-methyl styrene; dienes, such as butadiene, chloroprene; amides, such as acrylic acid amide, acrylic acid anilide; nitriles, such as acrylic acid nitrile; esters of α,β-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. Usually, at least 10% of the copolymer is vinyl chloride and the class of copolymers in which a predominant portion, i. e., more than 50% by weight of the copolymer is made from vinyl chloride, represents a preferred class of polymers to be plasticized according to the invention.

A particularly preferred embodiment of the invention comprises the plasticization of polymers prepared by copolymerizing vinyl chloride and an ester of an α,β-unsaturated dicarboxylic acid such as diethyl maleate, in which 5–30 parts by weight of the dicarboxylic acid ester are used for every 95–70 parts by weight of vinyl chloride. Among the preferred esters of α,β-unsaturated dicarboxylic acids are the alkyl esters in which the alkyl group contains 1–8 carbon atoms.

It is obvious that many variations may be made in the processes and products of this invention without departing from the spirit and scope thereof as defined in the appended claims.

What is claimed is:

1. A composition comprising a vinyl chloride-containing polymer and a compatible amount of an alkyl ester of sulfonyl dipropionic acid in which the alkyl groups contain 6–12 carbon atoms.

2. A composition as defined in claim 1 in which the polymer is polyvinyl chloride.

3. A composition as defined in claim 1 in which the polymer is a copolymer of vinyl chloride and a vinyl ester of a saturated aliphatic acid.

4. A composition as defined in claim 3 in which the polymer is a copolymer of vinyl chloride and vinyl acetate.

5. A product as defined in claim 1 in which the polymer is a copolymer of vinyl chloride and an ester of an α,β-unsaturated dicarboxylic acid.

6. A product as defined in claim 1 in which the polymer is a copolymer of vinyl chloride and diethyl maleate.

7. A composition comprising a vinyl chloride-containing polymer and a compatible amount of 2-ethyl hexyl sulfonyl dipropionate.

8. A composition as defined in claim 7 in which the polymer is polyvinyl chloride.

9. A composition as defined in claim 7 in which the polymer is a copolymer of vinyl chloride and a vinyl ester of a saturated fatty acid.

10. A composition as defined in claim 9 in which the polymer is a copolymer of vinyl chloride and vinyl acetate.

11. A composition as defined in claim 7 in which the polymer is a copolymer of vinyl chloride and an ester of an α,β-unsaturated dicarboxylic acid.

12. A composition as defined in claim 11 in which the polymer is a copolymer of vinyl chloride and diethyl maleate.

GEORGE L. FRASER.

REFERENCES CITED

The following references are of record in the file of this patent:

UNITED STATES PATENTS

| Number | Name | Date |
|---|---|---|
| 2,127,400 | Gibbs | Aug. 16, 1938 |
| 2,245,500 | Rein | June 10, 1941 |
| 2,262,686 | Kyrides | Nov. 11, 1941 |
| 2,427,640 | Whitehill | Sept. 16, 1947 |
| 2,438,092 | Lynch | Mar. 16, 1948 |

OTHER REFERENCES

Loven: Berichte 29, p. 1138 (1896).